United States Patent
Honda et al.

(10) Patent No.: US 6,806,473 B2
(45) Date of Patent: Oct. 19, 2004

(54) RADIATION IMAGE DETECTOR

(75) Inventors: Chika Honda, Tokyo (JP); Hiromu Ohara, Tokyo (JP); Hiroshi Kita, Tokyo (JP); Kazuo Genda, Tokyo (JP)

(73) Assignee: Konica Corporation, Tokyo (JP)

( * ) Notice: Subject to any disclaimer, the term of this patent is extended or adjusted under 35 U.S.C. 154(b) by 158 days.

(21) Appl. No.: 10/201,062

(22) Filed: Jul. 22, 2002

(65) Prior Publication Data

US 2003/0025084 A1 Feb. 6, 2003

(30) Foreign Application Priority Data

Aug. 3, 2001  (JP) ........................................ 2001-236955

(51) Int. Cl.[7] ................................................ G01T 1/24
(52) U.S. Cl. ............... 250/370.11; 250/207; 250/208.1; 250/370.09; 250/580
(58) Field of Search .......................... 250/207, 208.1, 250/370.09, 370.11, 580

(56) References Cited

U.S. PATENT DOCUMENTS

| | | | | |
|---|---|---|---|---|
| 5,548,122 A | * | 8/1996 | Shoji | 250/370.09 |
| 5,629,515 A | * | 5/1997 | Maekawa | 250/207 |
| 5,661,309 A | * | 8/1997 | Jeromin et al. | 250/580 |
| 5,880,470 A | * | 3/1999 | Umetani et al. | 250/370.09 |
| 6,403,965 B1 | * | 6/2002 | Ikeda et al. | 250/370.09 |
| 6,518,557 B1 | * | 2/2003 | Izumi et al. | 250/208.1 |
| 2002/0109097 A1 | * | 8/2002 | Tashiro | 250/370.09 |

* cited by examiner

Primary Examiner—John R. Lee
Assistant Examiner—Mary El-Shammaa
(74) Attorney, Agent, or Firm—Frishauf, Holtz, Goodman & Chick, P.C.

(57) ABSTRACT

A radiation image detector is provided with a first layer to emit light corresponding to a strength of a radiation incident thereon; a second layer to convert the light emitted from the first layer into electric energy; a third layer to accumulate the electric energy obtained by the second layer and to output a signal based on the accumulated electric energy so that the radiation image detector outputs an image signal corresponding to the incident radiation based on the signal outputted from the third layer; and a forth layer made of a resin and to hold the first, second and third layers.

20 Claims, 11 Drawing Sheets

FIG. 2

EXAMPLE OF A STRUCTURE OF A RADIATION IMAGE DETECTOR

FIG. 3

CIRCUIT STRUCTURE OF A RADIATION IMAGE DETECTOR

FIG. 4 PARTIAL SECTION OF AN IMAGING PANEL

FIG. 5

FUNDAMENTAL SKELETON OF CONDUCTIVE POLYMER

FIG. 6

EXAMPLES OF π CONJUGATED POLYMER (PART 1)

FIG. 7

EXAMPLES OF π CONJUGATED POLYMER (PART 2)

FIG. 8

EXAMPLES OF π CONJUGATED POLYMER (PART 3)

PDAPE

ROPPE-An

ROPPE-Py

ROPPE-Th

PDAPD

FIG. 9

EXAMPLES OF CONDUCTIVE POLYMER OTHER THAN π CONJUGATED POLYMER

FIG. 10

STRUCTURE OF ORGANIC TFT

RADIATION IMAGE DETECTOR

BACKGROUND OF THE INVENTION

The present invention relates to the industrial field of a diagnosis by radiation images in medical care. In particular, it relates to a radiation image detector for obtaining radiation images used for a purpose of diagnoses.

As a method to obtain a radiation image, there has been used the so-called screen film system (SF system) in which a fluorescent screen and a film for radiography are combined. In this SF system, when radiation such as an X-ray transmitted through a subject enters a fluorescent screen, a phosphor contained in the fluorescent screen absorbs energy of the radiation to emit fluorescence. By this luminescence, a film for radiography that is superposed on the fluorescent screen to be close thereto is exposed, and a radiation image is formed on the film for radiography.

On the SF system, however, it is necessary to radiograph after making the spectral sensitivity region of the film for radiography to agree with that of the fluorescent screen. Further, the film for radiography needs to be subjected to chemical development and fixing, thus, it takes time to obtain radiation images and a developing solution and a fixing bath thus used are changed into a waste liquor, which is not preferable from the environmental view point.

Since an image in the SF system is an analog image, an operation to transfer image signals of the radiation images obtained by the SF system into digital signals is required to carry out remote diagnosis that utilizes a digital network system.

In the recent radiation image radiographing system, therefore, there is available a system to obtain radiation images by taking out digital and electric signals of radiation images, such as a computed radiography (CR) and a flat panel type radiation detector (FPD) serving as a digital type X-ray diagnosis apparatus in place of the SF system. The system of this kind does not use a radiation film which is used by the SF system, and therefore, there is no complicated process such as a developing process, and radiation images can be drawn quickly on a screen of an image display device, for example, on a screen of a cathode ray tube or a liquid crystal display panel.

In the field of the medical image diagnosis, a digital radiation image detecting means such as a computed tomograph (CT) and a nuclear magnetic resonance imaging (MRI) are commonly used recently, and thereby, the remote diagnosis has been made simple by using a network for images together with the images of the digital radiation image detecting means.

Further, the radiation image radiographing system used in the medical care site can be divided into a "floor type" and a "cassette type". The "floor type" is one to be used mainly for radiographing of a chest and an abdomen, and it is one wherein a radiation image detector and its peripheral equipment are integrated solidly to be used for radiographing on condition that the "floor type" is constantly installed in a radiographing room. In this case, a patient needs to visit the radiographing room by itself when the patient is radiographed for radiation images.

Regarding the "cassette type", on the other hand, in the case of the SF system, for example, a flat container that is called the cassette in which a fluorescent screen and a radiation film are housed is brought, for radiographing for radiation images, to a bed of a patient who is in a critical state and cannot move at all. Namely, in the "cassette type", a portable radiation emitting apparatus and a cassette are conveyed to a bed of a patient, and the patient can be radiographed while lying on the bed. In the case of chest-radiographing, for example, it is said that the radiographing using a cassette occupies 50% of the total chest-radiographing.

Incidentally, though CR representing a digital radiation image detector can be used as a radiation image detector of a cassette type, in the same way as in the SF system, it is expensive and it cannot offer image quality which is the same as that in the SF system. FPD, on the other hand, can offer image quality that is equal to or better than that in the CR, but it is expensive in the same way as in the SF system, and it is difficult to realize a light radiation image detector of a cassette type.

SUMMARY OF THE INVENTION

In the invention, therefore, there is to be provided a radiation image detector which is inexpensive and light in weight and can make a digital radiation image with high image quality to be obtained.

A radiation image detector related to the invention is provided with a first layer that conducts light emission based on intensity of radiation entered, a second layer that converts light emitted from the first layer into electric energy, a third layer that outputs signals based on accumulation of the electric energy obtained by the second layer and on the accumulated electric energy, and a fourth layer that holds the first layer, the second layer and the third layer, and image signals of the radiation entered are outputted based on the signals outputted from the third layer, and the fourth layer is formed with resin.

In the present invention, the first layer, the second layer and the third layer are formed on the fourth layer that is made of resin. The first layer is formed by using, for example, cesium iodide (CsI:Tl) or gadolinium oxysulfide ($Gd_2O_2S$:Tb), and light emission corresponding to intensity of the radiation entered is conducted. The second layer is formed by using an organic compound capable of conducting photoelectric conversion, for example, conductive polymer containing fullerene or carbon nanotube, and light outputted from the first layer is converted into electric energy. The third layer is formed by using an organic semiconductor or an element of a layer upon layer structure of divided silicone, and it outputs signals based on accumulation of the electric energy obtained by the second layer and on the accumulated electric energy, thus, image signals of the radiation image are outputted based on the signals outputted from the third layer.

Further, the radiation image is made to be of a portable structure, and a power supply means structured with a sheet-shaped battery, for example, is provided, and power necessary to drive the radiation image detector is supplied from the power supply means. Further, a memory means that stores image signals is provided.

DETAILED DESCRIPTION OF THE PREFERRED EMBODIMENT

Figure 1:
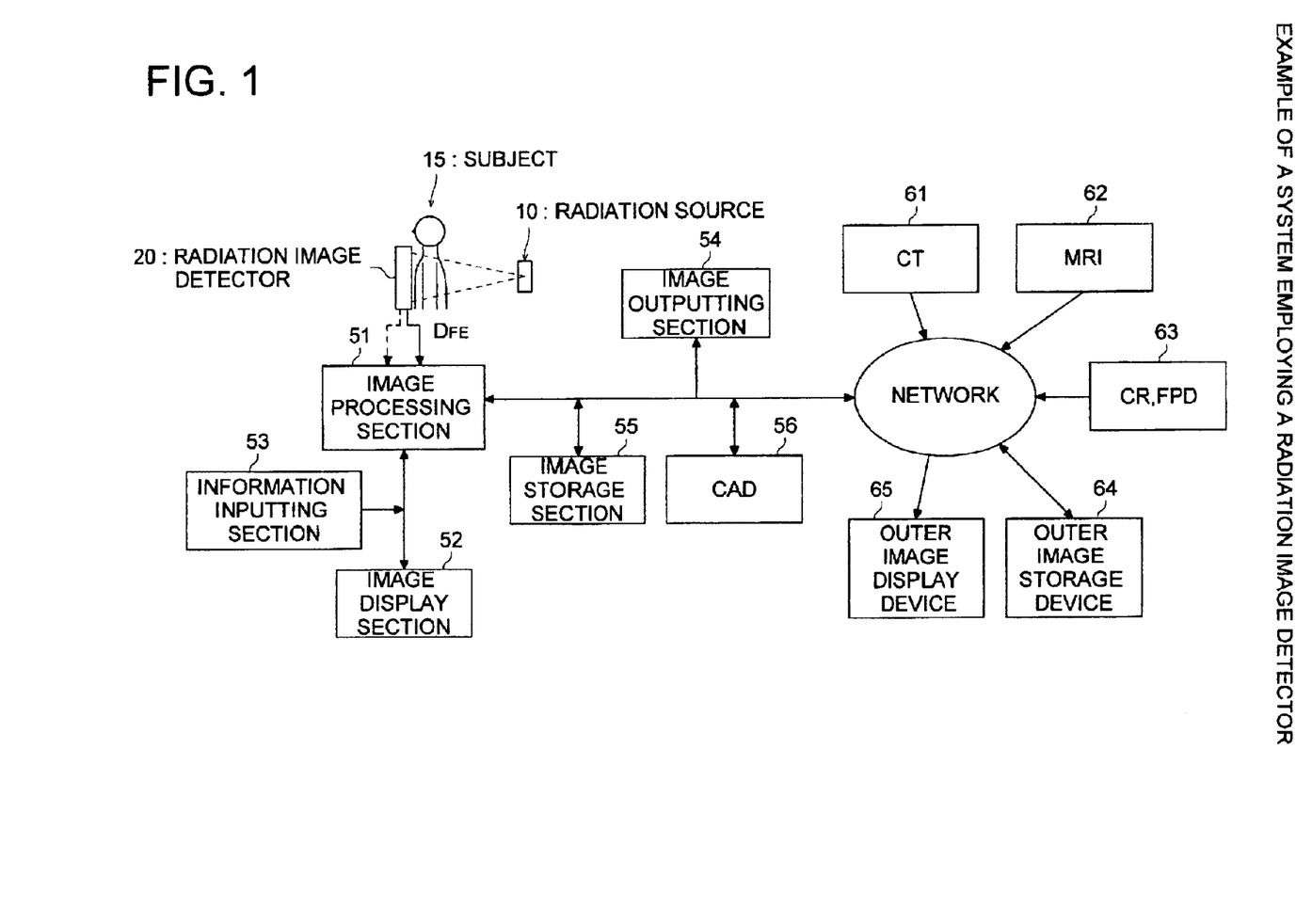
FIG. 1 is a diagram showing an example of a system that uses a radiation image detector.

Next, an embodiment of the invention will be explained in detail as follows, referring to the drawings. FIG. 1 is a diagram showing an example of a system that uses a radiation image detector. In FIG. 1, radiation emitted from radiation source 10 is irradiated on radiation image detector 20 through subject (a patient, for example, in a medical facility) 15. In the radiation image detector 20, image signal DFE is generated based on intensity of the radiation irradiated. The image signal DFE thus generated is read out by image processing section 51 that is connected with the radiation image detector 20. Or, the image signal DFE is accumulated in a portable recording medium such as a semiconductor memory card mounted on the radiation image detector 20, for example, and then is supplied to the image processing section 51, when the recording medium is removed from the radiation image detector 20 and mounted on the image processing section 51.

In the image processing section 51, the image signal DFE generated by the radiation image detector 20 is subjected to processing of shading correction, gain correction, gradation correction, edge emphasizing processing and dynamic range compression processing, so that the image signal DFE may turn into an image signal suitable for diagnosis. Further, to the image processing section 51, there is connected image display section 52 that is structured by using a cathode ray tube, a liquid crystal display element, or a projector, and on the image processing section 51, there is displayed an image based on an image signal in the course of image processing or an image signal after completion of image processing.

Further, in the image processing section 51, an image is enlarged and reduced, and an image signal is subjected to compression processing and extension processing so that accumulation or transmission of image signals may become easy. Therefore, it is possible to confirm the region for radiographing and the state of processing easily, by enlarging or reducing images displayed on the image display section 52. Further, it is possible to make the displayed image or the area of the displayed image to be designated, and to conduct appropriate image processing automatically for the designated image and designated area.

To the image processing section 51, there is connected information inputting section 53 that is structured by using a key board, a mouse and a pointer, and it is possible to input patient information by using this information inputting section 53 and to add additional information to image signals. Further, designation of image processing, saving and reading of image signals and indication for conducting sending and receiving of image signals through the network are carried out from the information inputting section 53.

To the image processing section 51, there are further connected image outputting section 54, image saving section 55 and computer aided image automatic diagnosing section (CAD) 56.

In the image outputting section 54, a recording sheet or a film is made to display a radiation image for outputting. For example, exposure is made based on image signals for those using a silver halide film. When the exposed silver halide photographic film is subjected to photographic processing, radiation images are outputted as silver images. Further, when the radiation images are printed on a recording sheet for outputting, the image outputting section 54 is structured by using an ink-jet printer wherein pressure is applied on ink based on image signals, and ink is jetted from the tip of a thin nozzle to a recording sheet for printing, a thermal printer for transferring images on a recording sheet by melting or sublimating ink based on image signals, or a laser printer wherein a photoreceptor is scanned by a laser beam based on image signals, then, toner sticking to the photoreceptor is transferred onto a sheet of paper to be fixed by heat and pressure, thus, images are formed on the recording sheet.

In the image saving section 55, image signals of radiation images are saved so that they can be read out properly as occasion demands. The image saving section 55 saves image signals by utilizing, for example, a magnetic hologram element, punched holes and dye distribution changes.

CAD 56 conducts computer processing and computer analysis for radiation images obtained through radiographing, and thereby supports diagnosis by giving information necessary for diagnosis to a doctor so that a change to a morbid state may not be overlooked. In addition, a diagnosis is made automatically based on the results of the computer processing and computer analyses.

Image signals of radiation images can be sent to other departments in the same hospital facility or to remote places through not only the aforesaid image outputting section 54, image saving section 55 and CAD 56 but also network 60 such as the so-called LAN, the Internet and PACS (medical image network). In addition, image signals obtained from CT61 or MR162, or image signals obtained from CR or other FPD63 and other inspection information are made to be sent through the aforesaid network, and image signals and inspection information are also displayed on image display section 52, or outputted from image outputting section 54, for the purpose of comparing with radiation images obtained by radiation image detector 20, for studies. It is also possible to make the image saving section 55 to save the transmitted image signals and inspection information. Further, image signals of radiation images obtained by radiation image detector 20 are also made to be saved in outer image saving apparatus 64, or radiation images obtained by the radiation image detector 20 are made to be displayed on outer image display apparatus 65.

Figure 2:
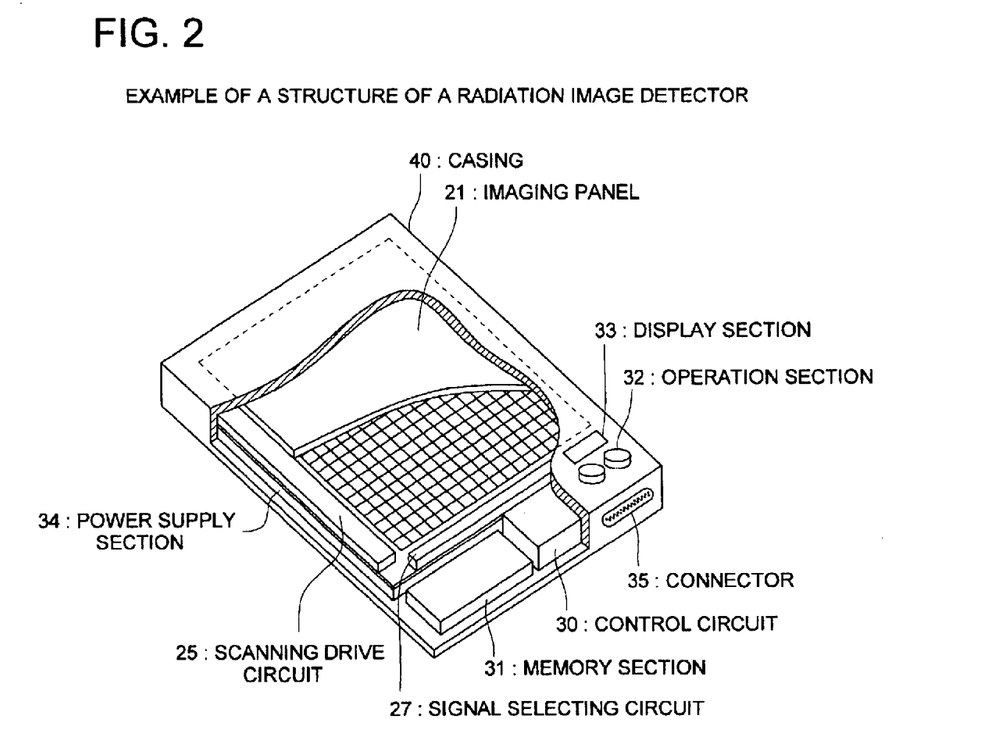
FIG. 2 is a diagram showing an example of the structure of the radiation image detector.

Next, an example of the structure of radiation image detector 20 is shown in FIG. 2. On the radiation image detector 20, there are provided imaging panel 21, control circuit 30 that controls operations of the radiation image detector 20, memory section 31 that stores, by using a memory that is rewritable and is exclusive for reading (for example, flash memory), the image signals outputted from imaging panel 21, operation section 32 for switching operations of the radiation image detector 20, display section 33 which shows completion of preparation for radiographing for radiation images and shows that image signals in the prescribed amount have been written in the memory section 31, power supply section 34 that supplies power necessary for driving imaging panel 21 and for obtaining image signals, connector for communication 35 through which the radiation image detector 20 communicates with image processing section 51, and casing 40 in which the aforesaid items are housed. Further, the imaging panel 21 has therein scanning driving circuit 25 that reads electric energy accumulated in accordance with intensity of irradiated radiation and signal selection circuit 27 that outputs the accumulated electric energy as image signals. Incidentally, an side of the casing 40, the scanning driving circuit 25, the signal selection circuit 27, the control circuit 30 and the memory section 31 are covered by an unillustrated radiation-shielding member, thus, it is prevented that scattering of radiation is caused inside the casing 40, and each circuit is irradiated by radiation.

It is a preferable embodiment that an enclosure of the casing 40 is made of a material which can resist impact from the outside and is light to the utmost, namely of a material of aluminum or its alloy. The side of the casing through which the radiation enters is structured by using a nonmetal which easily transmits radiation, namely by using, for example, carbon fibers. In the case of the back side that is opposite to the side of the casing through which the radiation enters, it is a preferable embodiment that a material that absorbs radiation effectively, namely, a lead plate is used, for preventing that radiation passes through radiation image detector 20, or for preventing an influence from the second-order radiation that is caused when a material constituting the radiation image detector 20 absorbs radiation.

Figure 3:
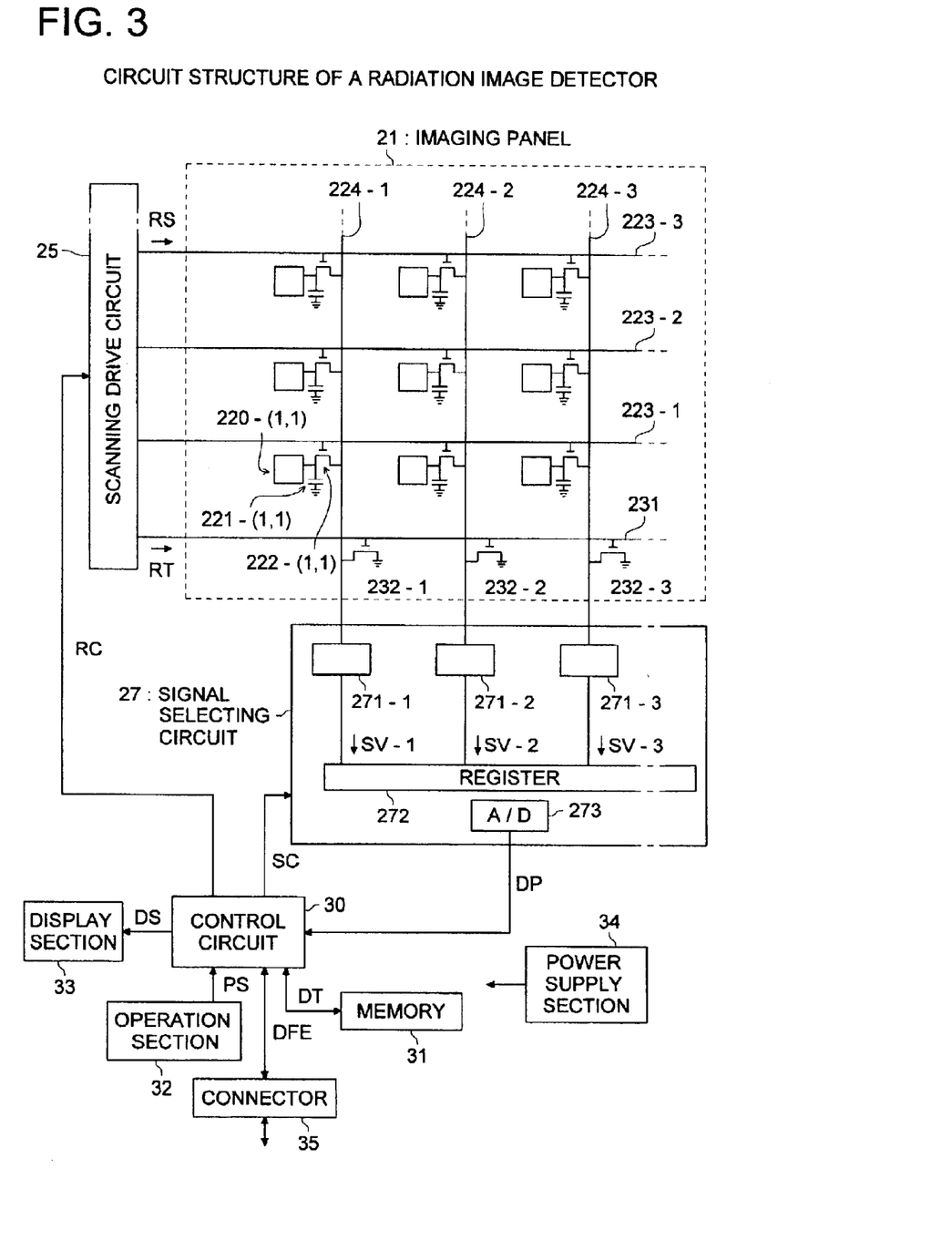
FIG. 3 is a diagram showing the circuit structure of the radiation image detector.

FIG. 3 shows the structure of imaging panel 21, and on the imaging panel 21, there is arranged, on two-dimensional basis, collecting electrode 220 that is for reading electric energy accumulated in accordance with intensity of irradiated radiation, and electric energy is accumulated in capacitor 221 with the collecting electrode 220 that is made to be an electrode on one side of the capacitor 221. In this case, one collecting electrode 220 corresponds to one pixel of a radiation image.

Between pixels, there are arranged scanning lines 223-1 to 223-m and signal lines 224-1 to 224-n so that they may cross at right angles. To capacitor 221-(1, 1), there is connected transistor 222-(1, 1) which is structured in the way of a silicone layer upon layer structure or structured with organic semiconductors. This transistor 222-(1, 1) is, for example, a field effect transistor, and a drain electrode or a source electrode is connected with collecting electrode 220-(1, 1), while, a gate electrode is connected to scanning line 223-1. When the drain electrode is connected to the collecting electrode 220-(1, 1), the source electrode is connected to signal line 224-1, and when the source electrode is connected to the collecting electrode 220-(1, 1), the drain electrode is connected to signal line 224-1. Further, for collecting electrode 220, capacitor 221 and transistor 222 of another pixel, the scanning line 223 and signal line 224 are connected in the same way.

Figure 4:
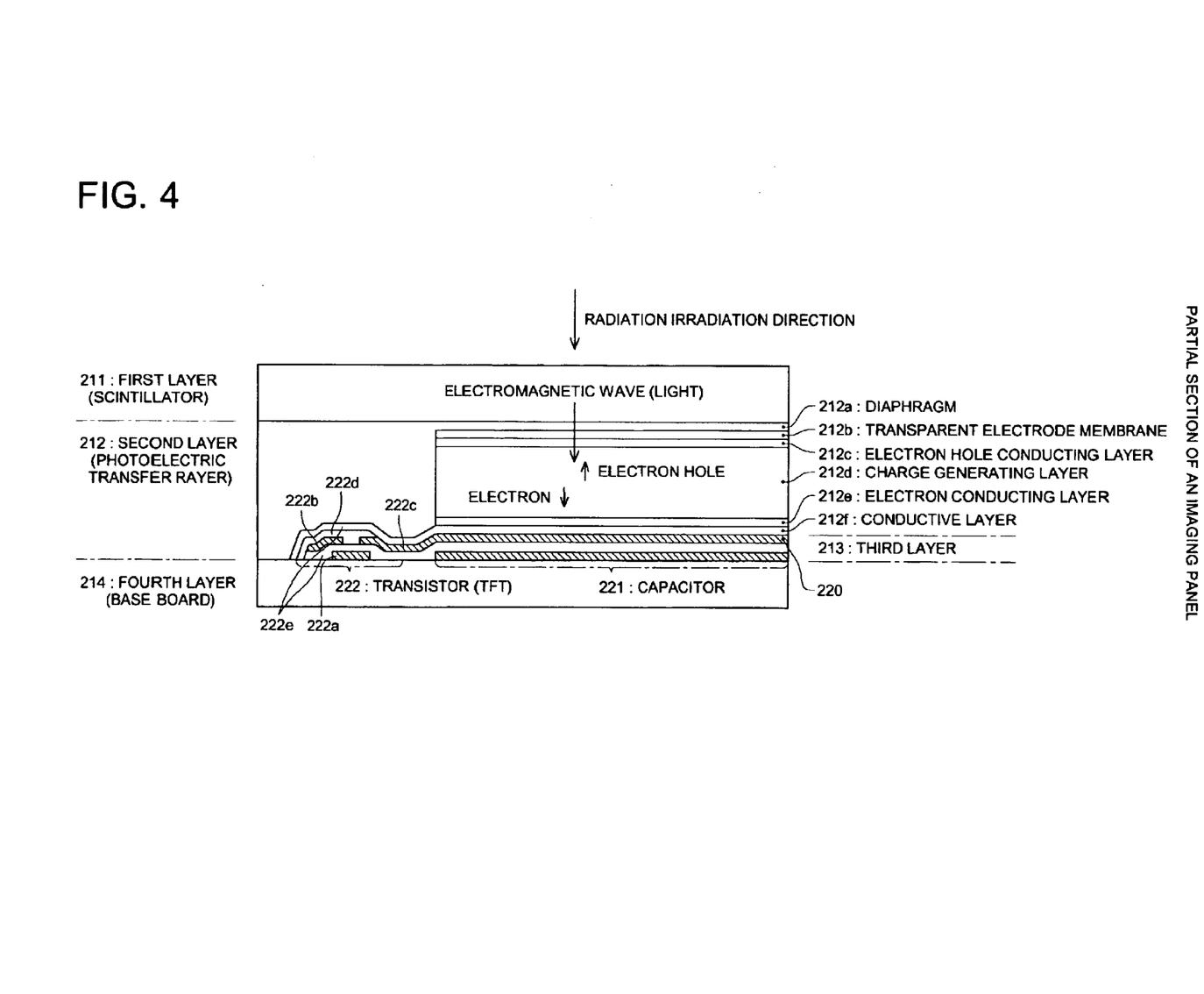
FIG. 4 is a partial section of an imaging panel.

FIG. 4 shows a partial section of imaging panel 21, and on the side where radiation is irradiated, there is provided a first layer 211 that emits light according to intensity of radiation that enters. In this case, the first layer 211 is irradiated by the so-called X-ray representing an electromagnetic wave that has a wavelength of about 1 angstrom ($1 \times 10^{-10}$m) and is transmitted through a human body and parts of a vessel and an airplane. This X-ray is outputted from radiation source 10, and a fixed anode X-ray tube or a rotation anode X-ray tube is generally used for the radiation source 10. For the X-ray tube, load voltage for an anode is made to be 10 kV–300 kV, and it is 20 kV–150 kV when the X-ray tube is for medical use.

The first layer 211 is one whose main component is a phosphor, and it outputs, based on the radiation entered, an electromagnetic wave having a wavelength of 300 nm–800 nm, namely a wavelength (light) covering from ultraviolet rays to infrared rays with visible rays between them. Incidentally, the first layer 211 is generally called a scintillator layer.

Phosphors which can be used for the first layer 211 include a tungstate phosphor such as $CaWO_4$, $CaWO_4$:Pb or MgWO; a terbium activated rare earth sulfide phosphor such as $Y_2O_2S$:Tb, $Gd_2O_2S$:Tb, $La_2O_2S$:Tb, (Y, Gd)$_2O_2S$:Tb, (Y, Gd)$_2O_2S$:Tb or Tm; a terbium activated rare earth phosphate phosphor such as $YPO_4$:Tb, $GdPO_4$:Tb or $LaPO_4$:Tb; a terbium activated rare earth oxyhalide phosphor such as LaOBr:Tb, LaOBr:Tb, Tm, LaOCl:Tb, LaOCl:Tb, Tm, GdOBr:Tb, GdOBr:Tb, Tm, GdOCl:Tb or GdOCl:Tb or Tm; a thulium activated rare earth oxyhalide phosphor such as LaOBr:Tm or LaOCl:Tm; a gadolinium activated rare earth oxyhalide phosphor such as LaObr:Gd or LuOCl:Gd; a cerium activated rare earth oxyhalide phosphor such as GdOBr:Ce, GdOCl:Ce, (Gd, Y) Obr:Ce or (Gd, Y) OCl:Ce; a barium sulphate phosphor such as $BaSO_4$:Pb, $BaSO_4$:Eu$^{2+}$ or (Ba, Sr) $SO_4$:Eu$^{2+}$; an europium activated alkali earth metal phosphate phosphor such as $Ba_3$ $(PO_4)_2$:Eu$^{2+}$, $(Ba_2PO_4)_2$:Eu$^{2+}$, $Sr_3$ $(PO_4)_2$Eu$^{2+}$ or $(Sr_2PO_4)_2$:Eu $^{2+}$; an europium (II) activated alkali earth metal fluoride halide phosphor such as $BaFCl$:Eu$^{2+}$, $BaFBr$:Eu$^{2+}$, $BaFCl$:Eu$^{2+}$, Tb, $BaFCl$:Eu$^{2+}$, Tb, $BaF_2.BaCl_2.KCl$:Eu$^{2+}$ or (Ba, Mg) $F_2.BaCl_2.KCl$:Eu$^{2+}$; an iodide phosphor such as CsI:Na, CsI:Tl, NaI or KI:Tl; a sulfide phosphor such as ZnS:Ag, (Zn, Cd) S:Ag, (Zn, Cd) S:Cu, (Zn, Cd) S:Cu or Ag; a hafnium phosphate phosphor such as $HfP_2O_7$, $HfP_2O_7$:Cu or $Hf_3$ $(PO_4)_4$ and Na tantalate phosphor such as $YtaO_4$, $YTaO_4$:Tm, $YtaO_4$:Nb, (Y, Sr) $TaO_4$:Nb, $LuTaO_4$, $LuTaO_4$:Tm, $LuTaO_4$:Nb, (Lu, Sr) $TaO_4$:Nb, $GdTaO_4$:Tm, $Mg_4Ta_2O_9$:Nb or $Gd_2O_3.Ta_2O_5.B_2O_3$:Tb, and further include $Gd_2O_2S$:Eu$^{3+}$, (La, Gd, Lu)$_2Si_2O_7$:Eu, $ZnSiO_4$:Mn and $Sr_2P_2O_7$:Eu.

In particular, cesium iodide (CsI:Tl) and gadolinium oxysulfide ($Gd_2O_2S$:Tb) are preferable because they have high X-ray absorption and luminous efficiency, and by using them, it is possible to obtain images having low noise and high image quality.

Further, with regard to cesium iodide (CsI:Tl), it is possible to form a scintillator layer having a columnar crystal structure. In this case, it is possible to repress a decline of sharpness because the columnar crystal makes it possible to obtain a light guidance effect, namely, an effect to repress that emitted light in the crystal is radiated from the side of the columnar crystal, and when a phosphor layer is made to be thicker, X-ray absorption is increased and graininess can be improved.

However, the phosphor used in the invention is not limited to those stated above, and it has only to be a phosphor that outputs an electromagnetic wave in the area such as a visible, ultraviolet or infrared ray area, where a light-receiving element has photographic sensitivity when radiation is irradiated. The basis for the foregoing is that the smaller diameter of the phosphor particle prevents light scattering in the scintillator layer more, and higher sharpness can be obtained.

Further, it is preferable that the first layer 211 is formed by using phosphor particles containing oxygen O and gadolinium Gd and europium Eu representing a rare-earth element. Since the phosphor particles having the structure stated above have high absorbing rate for radiation and high luminous efficiency (a quantity of light emission is great), radiation images having excellent graininess can be obtained. Further, if phosphor particles expressed with a general formula of $(Gd, M, Eu)_2O_3$ are used under the assumption that M represents a rare-earth element, a radiation image whose graininess is better can be obtained because luminous efficiency of the phosphor particle expressed by the general formula is especially high. Let is be assumed in this case that at least one element or more of yttrium Y, niobium Nd, terbium Tb, dysprosium Dy, holmium Ho, erbium Er, thulium Tm and ytterbium Yb are contained as rare-earth element M. Since an absorption factor for radiation of these elements is high, radiation images having better graininess can be obtained. It is further possible to make the absorption factor for radiation and luminous efficiency to be higher, by making gadolinium Gd, rare-earth element M and europium Eu to be contained respectively by 40 wt %–95 wt %, 5 wt %–40 wt % and 2 wt %–20 wt %. In particular, a range of 70 wt %–90 wt % is preferable for gadolinium Gd, and a range of 5 wt %–10 wt % is preferable for europium Eu.

A crystallite size (in Wilson' method) representing an indicator showing a size of a crystallite that constitutes a phosphor particle, is made to be 10 nm–100 nm, because when the crystallite size is smaller than 10 nm, luminous efficiency is lower, and when it is greater than 100 nm, the yield of phosphors in manufacturing is worsened. A particle size of a phosphor particle is made to be 0.2 μm–5 μm, because luminous efficiency is lowered when the particle size is smaller than 0.2 μm, while scattering of emitted light in the first layer 211 becomes greater and sharpness is worsened if the particle size is greater than 5 μm. It is preferable that the particle size of the phosphor particle is in the range of 0.5 μm–2 μm.

Further, it is preferable that a phosphor particle is spherical in a shape, because dispersibility of phosphor particles in binders becomes higher when the phosphor particle is spherical, and thereby a charging rate of phosphor particles in binders can be raised, and graininess can be improved.

The phosphor particle of this kind is obtained when urea is added to a water solution containing a rare-earth element so that basic carbonate may be precipitated and deposited, and a deposit thus obtained is subjected to solid-liquid separation to be baked at a temperature of 500° C. or higher.

To be concrete, in the case of using yttrium Y as rare-earth element M, a water solution containing gadolinium Gd, yttrium Y and europium Eu is heated for 0.5–5 hours at a temperature of 80° C. or higher, then, hydrogen peroxide and urea are added to the water solution which is further heated, and thereby, a spherical particle of basic carbonate of rare-earth element is precipitated. When this basic carbonate of rare-earth element thus precipitated is subjected to solid-liquid separation, a spherical particle of basic carbonate of rare-earth element is obtained. When this spherical particle of rare-earth element is further baked in air or in an oxidizing atmosphere, a spherical particle of an oxide of rare-earth element can be obtained. As a salt of water-soluble rare-earth element in this case, a nitrate is preferable. Further, as an amount of hydrogen peroxide to be added, addition of 1/300–30/100 for density of rare earth ion is preferable, and as an amount of urea to be added, addition of 3 times–5 times for density of rare earth ion is preferable. In addition, when basic carbonate of rare-earth thus obtained is baked at 500° C. or higher, it is possible to obtain spherical oxide particle of rare-earth element that keeps a shape of basic carbonate, and this oxide particle is used as a phosphor.

The phosphor particles produced in the way stated above are uniform in terms of a particle shape to be spherical, and a particle size distribution of them is narrow. Therefore, dispersibility of phosphor particles in the binder is high, and both uniformity of phosphor distribution in the irradiation direction of the radiation and a charging rate of phosphor particles in the binder are enhanced, which improves graininess and makes it possible to obtain excellent radiation images. Further, the foregoing makes scattering of radiation in the first layer 211 to be less, and makes it possible to obtain radiation images having less unsharpness.

The above-mentioned phosphor particles are dispersed in the following binder. For example, there are given polyurethane, vinyl chloride copolymer, vinyl chloride acrylonitrile copolymer, butadiene acrylonitrile copolymer, polyamide resin, polyvinyl butyral, cellulose derivative, styrene butadiene copolymer, various synthetic rubber type resins, phenol resin, epoxy resin, urea resin, melanin resin, phenoxy resin, silicone resin, acrylic resin, and urea formamido resin. It is preferable to use polyurethane, polyester, vinyl chloride copolymer, polyvinyl butyral and nitrocellulose among the aforesaid binders. By using the preferable binders, it is possible to enhance both dispersibility of phosphors and charging rate of phosphors, and to contribute to improvement of graininess.

The content by weight of phosphors dispersed in the above-mentioned binders is 90–99%. Further, a thickness of the first layer used in the invention is one determined by the balance between graininess and sharpness of radiation images, and it is made to be 20 μm–1 mm, for example, because sharpness becomes poor though graininess becomes excellent when the first layer is thick, while graininess becomes poor though sharpness becomes excellent when the first layer is thin. The thickness of the first layer is preferably made to be within a range of 50 μm–300 μm to obtain excellent graininess and sharpness.

Incidentally, it is preferable that phosphors used in the invention are sealed so that they may not be affected by environmental moisture, because they are hygroscopic except for a part of them. It is possible to seal the whole of imaging panel 21 by using the methods disclosed, for example, in TOKKAIHEI Nos. 11-223890, 11-249243 and 11-344598 and in TOKKAI No. 2000-171597.

Next, on the side opposite to the radiation-irradiated side of the first layer 211, there is formed second layer 212 that converts electromagnetic wave (light) outputted from the first layer into electric energy. The second layer 212 is provided with diaphragm 212a, transparent electrode membrane 212b, electron hole conducting layer 212c, charge generating layer 212d, electron conducting layer 212e and conductive layer 212f which are arranged in this order from the first layer 211 side. In this case, the charge generating layer 212d is one containing organic compounds which can conduct photoelectric transduction, namely, the organic compounds which can generate an electron and an electron hole with electromagnetic waves, and it is preferable, for smooth photoelectric transduction, that the charge generating layer 212d has some layers each having a separated function. For example, the second layer is constituted as shown in FIG. 4.

The diaphragm 212a is one for separating the first layer 211 from other layers, and oxi-nitride, for example, is used for the diaphragm. The transparent electrode membrane 212b is formed by using conductive transparent material such as, for example, indium tin oxide (ITO), $SnO_2$ and ZnO. When forming the transparent electrode membrane 212b, a thin membrane is formed by using a method of evaporation or of sputtering. Further, it is also possible to form a pattern having a desired form by a method of photolithography, or to form a pattern through a mask having a desired form in the course of evaporation or sputtering of the material for electrode stated above, when high accuracy is not necessary for the pattern (100 μm or more). It is preferable that transmission factor of the transparent electrode is made to be greater than 10% and the sheet resistance is several hundreds $\Omega/cm^2$. Further, a thickness of the membrane is usually 10 nm–1 μm though it depends on the material, and it is preferably selected to be within a range of 10 nm–200 nm. The basis for the foregoing is that the transparent electrode becomes to be in the state of islands when the membrane is thin, and it takes time to form the transparent electrode when the membrane is thick.

On the charge generating layer 212d, electrons and electron holes are generated by the electromagnetic wave (light) outputted from the first layer 211. The electron holes generated here are collected to the electron hole conducting layer 212c, while, the electrons are collected to the electron conducting layer 212e. Incidentally, the electron hole conducting layer 212c and the electron conducting layer 212e are not always indispensable.

The conductive layer 212f is made of chromium, for example. It can be selected from an ordinary metal electrode or from the transparent electrode mentioned above. However, for obtaining excellent characteristics, the one whose material for electrode is metal having a small work function (4.5 eV or less), alloy, conductive compound or mixture thereof is preferable. As a concrete example of the material for an electrode, there are given sodium, sodium-potassium alloy, magnesium, lithium, aluminum, magnesium/copper mixture, magnesium/silver mixture, magnesium/aluminum mixture, magnesium/indium mixture, aluminum/aluminum oxide mixture, indium, lithium/aluminum mixture and rare-earth metal. The conductive layer 212f can be made through a method of evaporation or sputtering by using the above-mentioned materials for electrode. Further, the sheet resistance of the conductive layer 212f which is several hundreds $\Omega/cm^2$ is preferable, and a thickness of the membrane is usually 10 nm–1 μm and it is preferably selected to be within a range of 50 nm–500 nm. The basis for the foregoing is that the conductive layer becomes to be in the state of islands when the membrane is thin, and it takes time to form the conductive layer when the membrane is thick.

Figure 5:
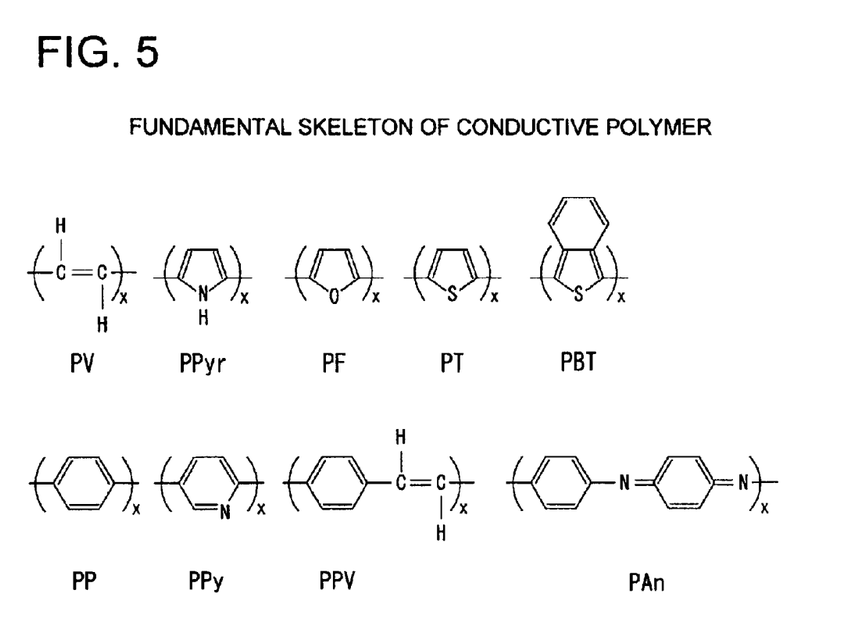
FIG. 5 shows the fundamental skeleton of a conductive high polymer compound.
Figure 6:
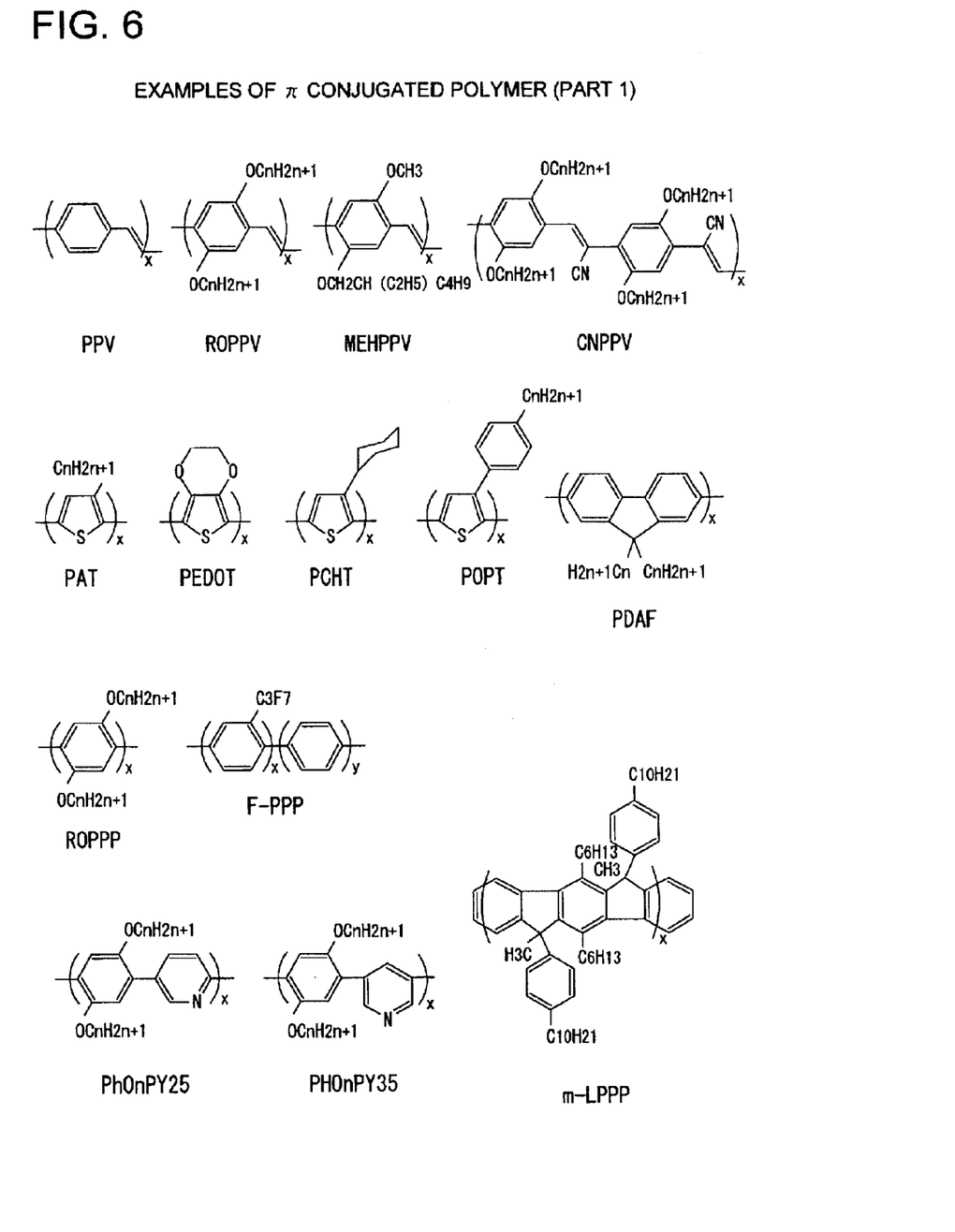
FIG. 6 is a diagram showing a concrete example (part 1) of π conjugated high polymer compound.
Figure 7:
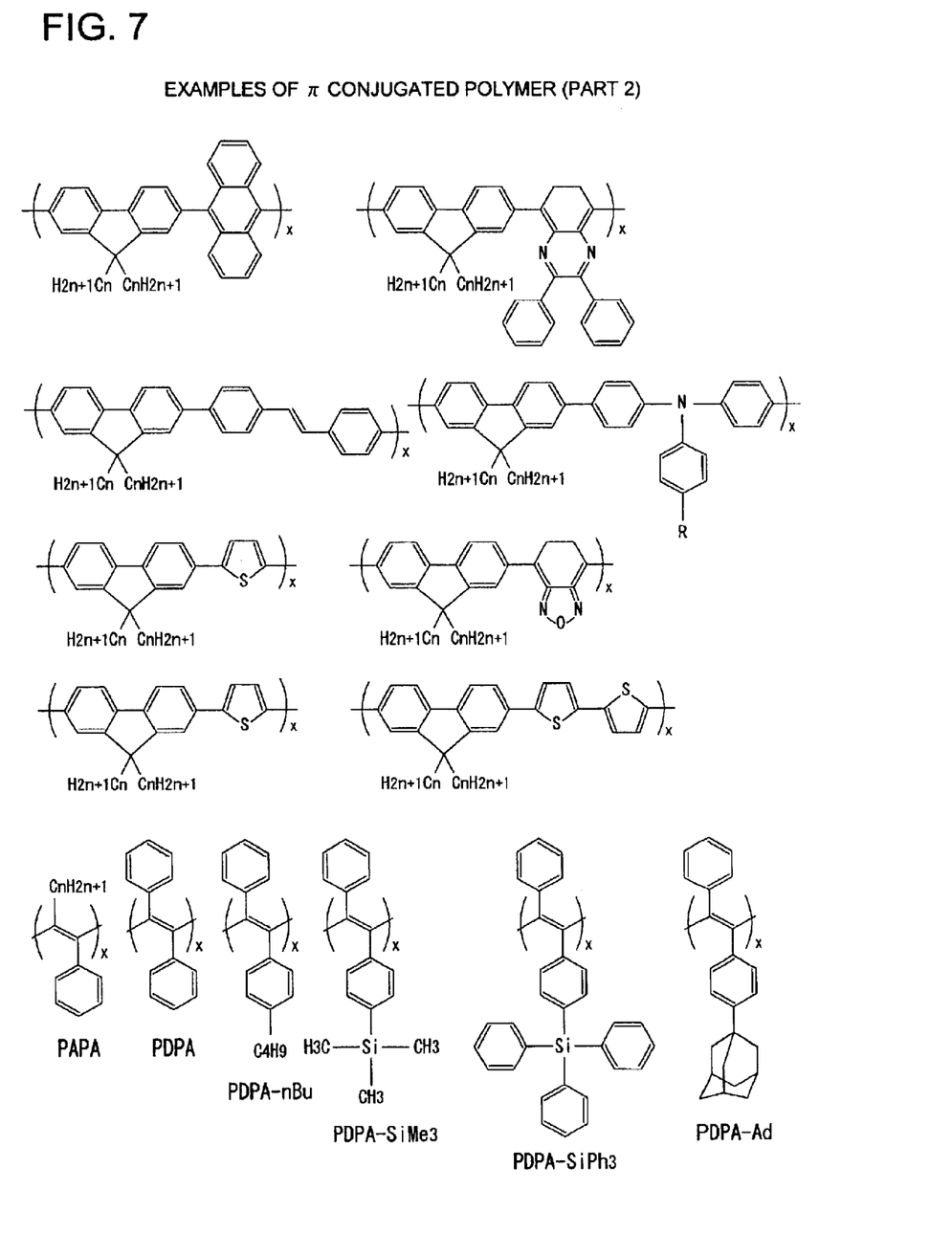
FIG. 7 is a diagram showing a concrete example (part 2) of π conjugated high polymer compound.
Figure 8:
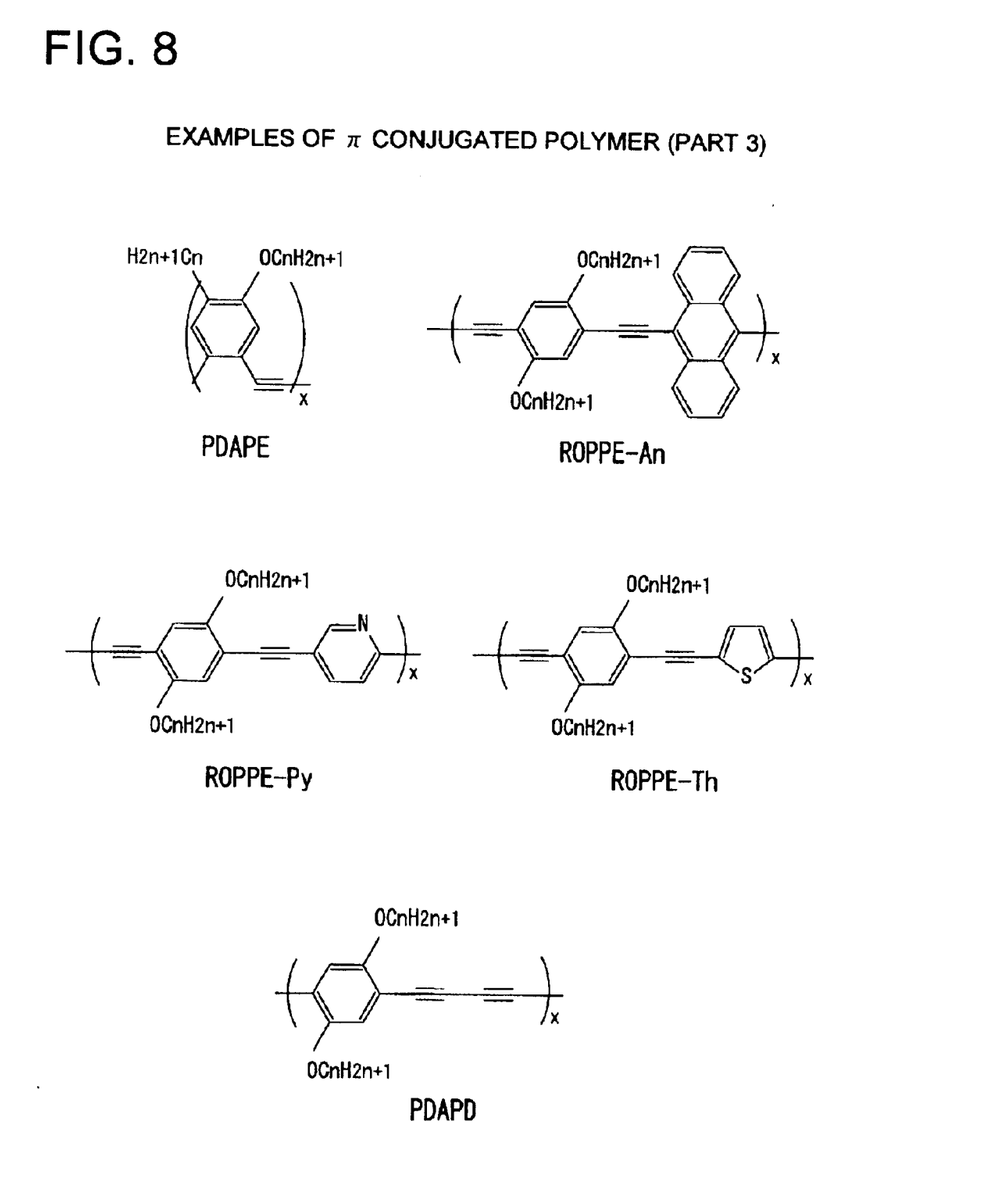
FIG. 8 is a diagram showing a concrete example (part 3) of π conjugated high polymer compound.
Figure 9:
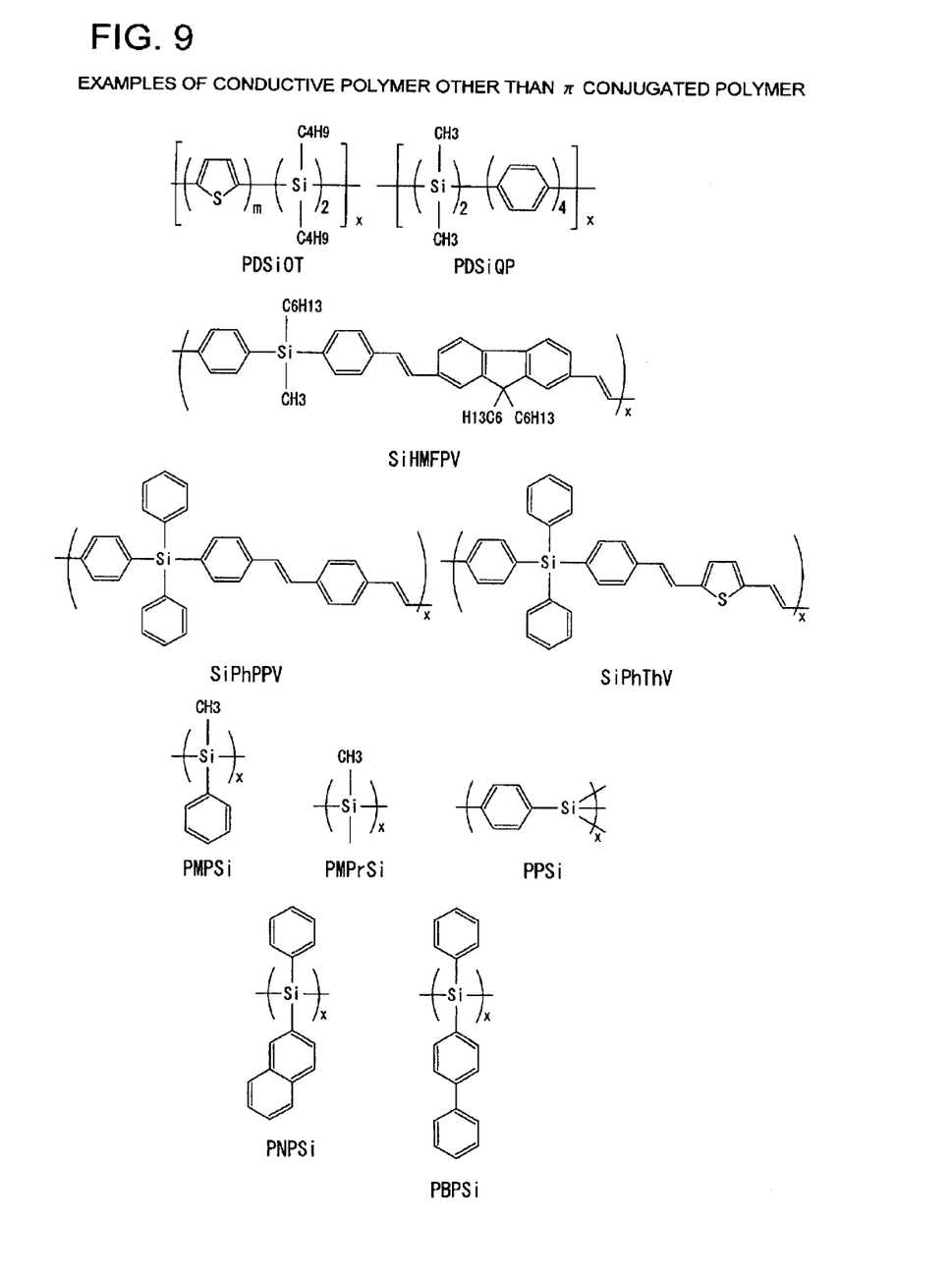
FIG. 9 is a diagram showing a concrete example of conductive polymer other than π conjugated polymer.

Next, the electron hole conducting layer 212c, the charge generating layer 212d and the electron conducting layer 212e will be explained in detail. The structure of the so-called organic EL element can be applied to the charge generating layer 212d, and the constituting material of the organic EL element may be either low molecular material or high molecular material (also called light-emitting polymer). As a material which can conduct photoelectric transduction and is used for the charge generating layer 212d of the invention, there are given a conductive and high polymer material (π conjugated high polymer material and silicone type high polymer material) and a light-emitting material used for low molecular organic EL element. As the conductive and high polymer material, for example, there are given poly (2-methoxy, 5-(2' ethyl hexyloxy)-p-phenylene vinylene) and poly (3-alkylthiophen). There are also given compounds described on pages 190–203 of "Organic EL element and Display (published on Feb. 28, 2001 by C.M.C. Co.) and compounds described on pages 81–99 of "Organic EL element and the Front of its Industrialization (published on Nov. 30, 1998 by N.T.S. Co.). As a light-emitting material used for the low molecular organic EL element, there are given compounds described on pages 36–56 of "Organic EL element and the Front of its Industrialization (published on Nov. 30, 1998 by N.T.S. Co.) and compounds described on pages 148–172 of "Organic EL element and Display (published on Feb. 28, 2001 by C.M.C. Co.). In the invention, what is preferable in particular as an organic compound capable of conducting photoelectric conversion is conductive high polymer compound, and what is most preferable is π conjugated high polymer compound. FIG. 5 shows the fundamental skeleton of a conductive high polymer compound, Each of FIGS. 6, 7 and 8 shows a concrete example of π conjugated high polymer compound, and FIG. 9 shows a concrete example of conductive high polymer compound other than π conjugated type ones. Incidentally, the conductive high polymer material and low molecular organic EL element are not limited to the foregoing.

Additives may be further added to the charge generating layer 212d in order to improve conversion efficiency or efficiency of transferring carriers to the electrodes. Further, the additives are added to another layer, for example, a hole transferring layer 212c or an electron transferring layer 212e. As the additives, a hole injecting material, a hole transporting material, an electron injecting material, and an electron transporting material, which are used in an organic EL element, can be applied. Examples thereof include a triazole derivative, an oxadiazole derivative, an imidazole derivative, a polyarylalkane derivative, a pyrazoline derivative and a pyrazolone derivative, a phenylenediamine derivative, an arylamine derivative, an amino substituted chalcone derivative, an oxazole derivative, a styryl anthracene derivative, a fluorenone derivative, a hydrazone derivative, a stilbene derivative, a silazane derivative, an aniline copolymer, an electroconductive oligomer, particularly a thiophene oligomer, a porphyrin compound, an aromatic tertiary amine compound, a styrylamine compound, a nitro-substituted fluorene derivative, a diphenylquinone derivative, a thiopyran dioxide derivative, a heterocyclic tetracarboxylic acid anhydride such as naphthaleneperylene, a carbodiimide, a fluolenylidenemethane derivative, an anthraquinodimethane an anthrone derivative, an oxadiazole derivative, a thiadiazole derivative, a quinoxaline derivative, a metal complex of an 8-quinolynol derivative (aluminum tris-(8-quinolinolate) (Alq3), aluminum tris-(5,7-dichloro-8-quinolinolate), aluminum tris-(5,7-dibromo-8-quinolinolate), aluminum tris-(2-methyl-8--quinolinolate), aluminum tris-(5-methyl-8-quinolinolate), and zinc bis-(8-quinolinolate) (Znq2).

Further, in the second layer 212, it is preferable to add compounds having three dimensional π electron cloud like fullerene and carbon nanotube to electron hole conducting layer 212c employing π conjugated high polymer compound, charge generating layer 212d and electron conducting layer 212e, for the purpose of conducting carrier transfer and carrier trap among a plurality of π conjugated high polymer compounds.

These compounds include for example, fullerene C-60, fullerene C-70, fullerene C-76, fullerene C-78, fullerene C84, fullerene C-240, fullerene C-540, mixed fullerene, fullerene nanotube, multi walled nanotube, and single wall nanotube. The fullerene or nanotube may have a substituent in order to provide compatibility to a solvent.

On the side opposite to the radiation-irradiated side on the second layer 212, there is formed third layer 213 that outputs signals based on accumulation of electric energy obtained by the second layer 212 and on accumulated electric energy.

The third layer 213 is constituted by the use of capacitor 221 that stores thereon, for each pixel, electric energy generated by the second layer 212 and transistor 222 representing a switching element for outputting accumulated electric energy as signals. Incidentally, the third layer is not limited to one employing a switching element, but it can also be of a structure to output by generating signals according to the energy level of the accumulated electric energy, for example.

TFT (thin-film transistor), for example, is used for the transistor 222. The TFT may be either one of an inorganic semiconductor type used for a liquid crystal display or one employing an organic semiconductor, and a preferable one is TFT formed on a plastic film. As TFT formed on a plastic film, there is known one that is of an amorphous silicone type, and in addition to that, there is another one wherein TFT is formed on a flexible plastic film by the FSA (Fluidic Self Assembly) technology developed by Alien Technology Co. in the United States of America, namely by arranging fine CMOS (Nanoblocks) made by single crystal silicon on an embossed plastic film. Furthermore, TFT using the organic semiconductor described in the document such as Science 283, 822 (1999), Appl. Phys. Lett, 771488 (1998) or Nature, 403, 521 (2000) is acceptable.

As stated above, as the switching element used in the invention, TFT made by the aforementioned FSA technology and TFT employing an organic semiconductor are preferable, and TFT employing an organic semiconductor is especially preferable. If TFT is constituted by using the organic semiconductor, a facility of a vacuum evaporation equipment needed in the case to structure TFT by using silicon is not necessary, and a printing technology or an ink-jet technology can be used for forming TFT, resulting in a low manufacturing cost. Further, it is also possible to form on a plastic base board that is not heat resistant, because processing temperature can be made low.

Figure 10:
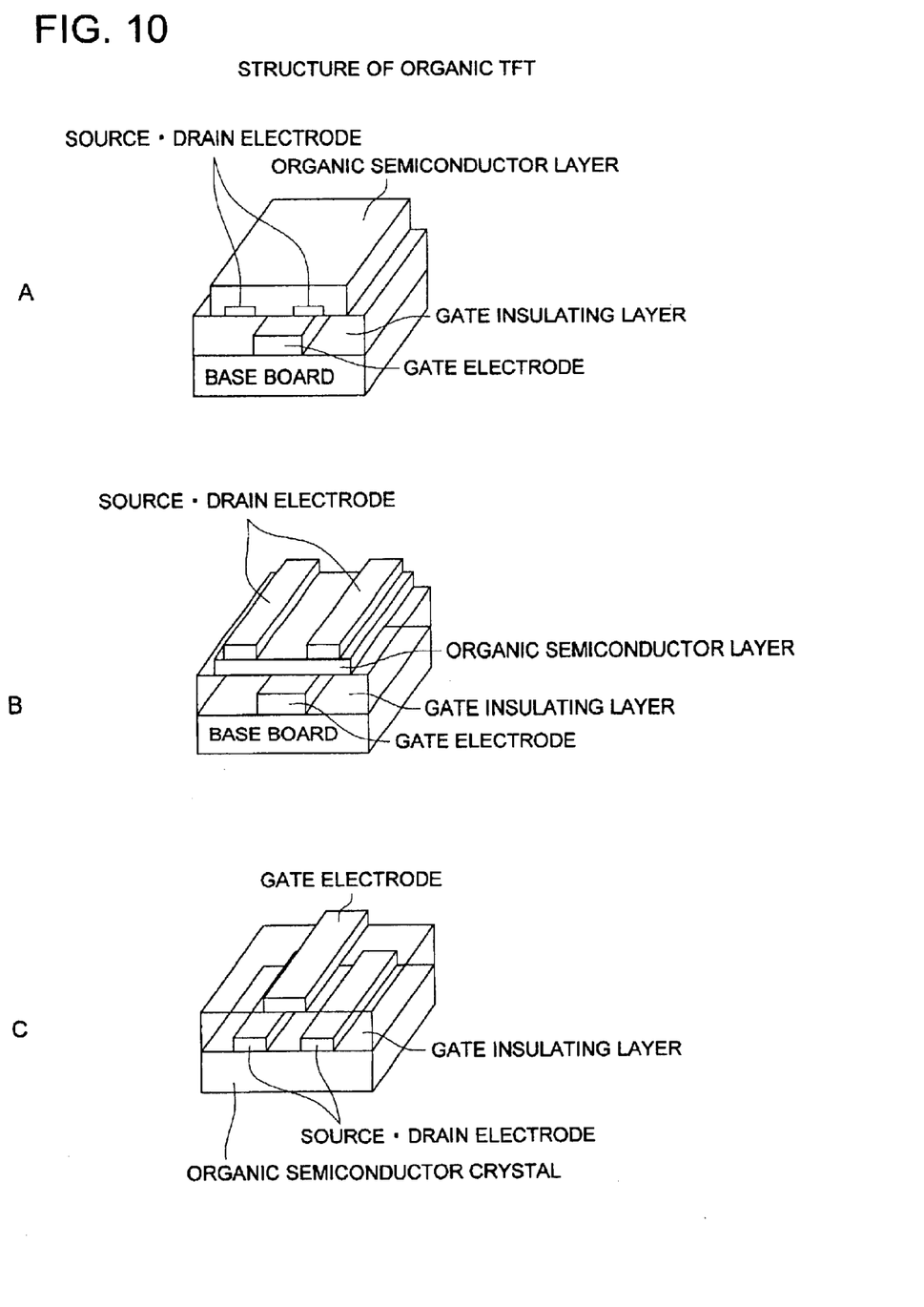
FIGS. 10A to 10C each is a diagram showing the structure of organic TFT.

In TFTs employing an organic semiconductor, a field effect transistor (FET) is especially preferable, and concretely, organic TFT having the structure shown in each of FIG. 10A–FIG. 10C is preferable. Organic TFT shown in FIG. 10A is one wherein a gate electrode, a gate insulating layer, a sourse-drain electrode and an organic semiconductor layer are formed successively on a base board. Organic TFT shown in FIG. 10B is one wherein a gate electrode, a gate insulating layer, an organic semiconductor layer and a sourse-drain electrode are formed successively on a base board, and organic TFT shown in FIG. 10C is one wherein a sourse-drain electrode, a gate insulating layer and a gate electrode are formed successively on an organic semiconductor single crystal.

A compound that forms an organic semiconductor may be either a single crystal material, or an amorphous material, and it may be either of low molecular or high molecular, and what is especially preferable is a single crystal of a condensed ring aromatic hydrocarbon compound represented by pentacene, toriphenylene and anthracene and the aforementioned π conjugated high polymer.

Figure 11:
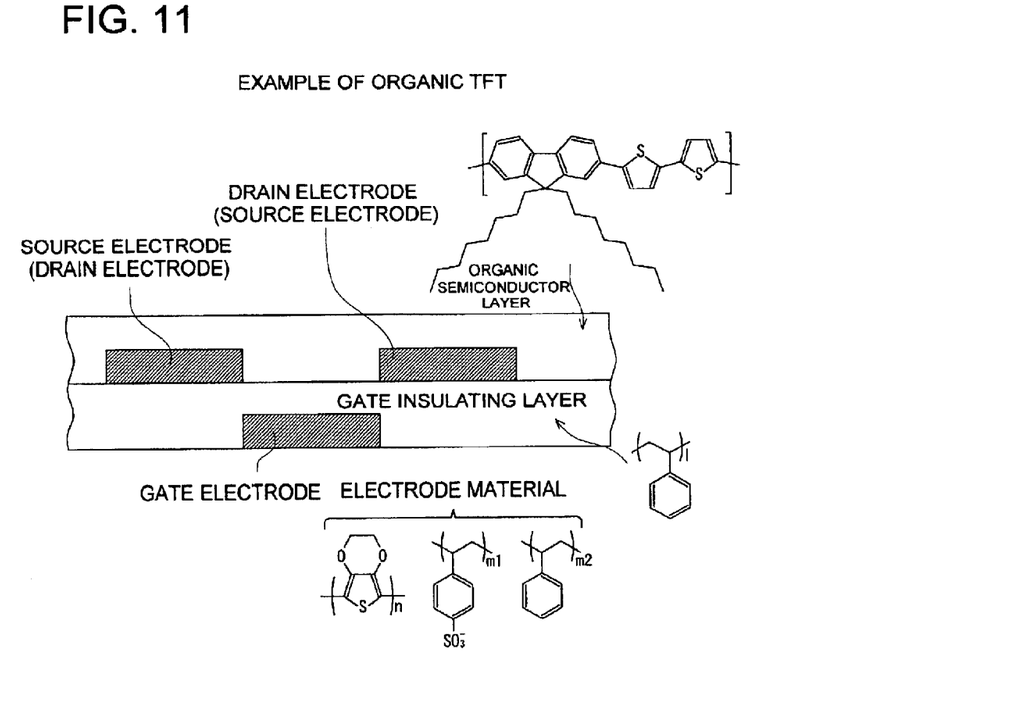
FIG. 11 is a diagram showing a concrete example of organic TFT.

A source electrode, a drain electrode and a gate electrode may be either one of metal, conductive inorganic compound and conductive organic compound, and from the viewpoint of easy manufacturing, the conductive organic compound is preferable, and its typical example is represented by one wherein Lewis acid (iron chloride, aluminum chloride, antimony bromide), halogen (iodide and bromide) and sulfonate (sodium salt of polystyrene sulfonic acid (PSS), potassium p-toluenesulfonate) are doped on the aforementioned π conjugated high polymer compound, and to be concrete, conductive high polymer wherein PSS is added to PEDOT is given as a typical example. As a concrete example of organic TFT, there are given those shown in FIG. 11.

To transistor 222 representing a switching element, there is connected collecting electrode 220 that stores electric energy generated by the second layer 212 as shown in FIGS. 3 and 4 and serves as an electrode on one side of capacitor 221. In the capacitor 221, there is accumulated electric energy generated by the second layer 212, and this accumulated electric energy is read out when transistor 222 is driven. Namely, by driving the switching element, it is possible to generate a signal for each pixel for radiation images. Incidentally, in FIG. 4, the transistor 222 is composed of gate electrode 222a, source electrode (drain electrode) 222b, drain electrode (source electrode) 222c, organic semiconductor layer 222d and insulating layer 222e.

Fourth layer 214 is a base board of imaging panel 21. A base board used preferably as the fourth layer 214 is a plastic film which includes films made of polyethylene terephthalate (PET), polyethylene naphthalate PEN), polyether sulfone (PES), polyether imido, polyether etherketone, polyphenylene sulfido, polyallylate, polyimido, polycarbonate (PC), cellulose triacetate (TAC) and cellulose acetate propionate (CAP). By using a plastic film as stated above, it is possible to attain light weight and to improve durability for impact, compared with an occasion of using a glass base board.

It is further possible to add plasticizer such as trioctylphosphate or dibutylphthalate to these plastic films, and to add known UV absorber of a benztriazole type or benzophenone type. Further, it is also possible to use, as a raw material, the resins made by applying the so-called organic-inorganic polymer hybrid method wherein inorganic macromolecule raw material such as tetraethoxy cilane is added to be made of a high molecular weight by giving energy such as chemical catalyst, heat or light.

On the side opposite to the third layer side on the fourth layer 214, there may also be provided power supply section 34 such as, for example, a primary cell such as a manganese battery, a nickel cadmium battery, a mercury battery or a lead battery, or a secondary cell of a charging type. As a shape of the battery, a flat plate shape is preferable so that a radiation image detector can be made to be of a thin type.

Further, on imaging panel 21, there are provided transistors 232-1–232-n for initializing wherein a drain electrode, for example, is connected to signal lines 224-1–224-n. A source electrode of the transistors 232-1–232-m is grounded. Further, a gate electrode is connected to reset line 231.

Scanning lines 223-1–223-m of imaging panel 21 and reset line 231 are connected with scanning drive circuit 25 as shown in FIG. 3. When reading signal RS is supplied from the scanning drive circuit 25 to one scanning line 223-p (p represents a value of either one of 1–m) out of scanning lines 223-1–223-m, transistors 222-(p,1)–222-(p,n) are turned on, and electric energy accumulated in capacitors 221-(p,1)–221-(p,n) are read out to signal lines 224-1–224-n. Signal lines 224-1–224-n are connected to signal converters 271-1–271-n of signal selecting circuit 27, and signal converters 271-1–271-n generate voltage signals SV-1–SV-n which are proportional to electric energy read out on signal lines 224-1–224-n. The voltage signals SV-1–SV-n outputted from the signal converters 271-1–271-n are supplied to register 272.

In the register 272, voltage signals thus supplied are selected in succession to be converted into digital image signal for one scanning line by A/D converter 273 (for example, 12 bit–14 bit), while, control circuit 30 supplies read signal RS to each of scanning lines 223-1–223-m through scanning drive circuit to conduct image scanning, and takes in digital image signal for each scanning line to generate image signals for a radiation image. The image signals are supplied to control circuit 30. Incidentally, when transistors 232-1–232-n are turned on by supplying reset signal RT to reset line 231 from scanning drive circuit 25, and transistors 222-(1,1)–222-(m,n) are turned on by supplying read signal RS to scanning lines 223-1–223-m, electric energy stored in capacitors 221-(1,1)–221-(m,n) are discharged through transistors 232-1–232-n, and thereby, initialization of imaging panel 21 can be carried out.

To control circuit 30, there are connected memory section 31 and operation section 32, and operations of radiation image detector 20 are controlled based on operation signal PS coming from the operation section 32. The operation section 32 is provided with a plurality of switches, and initialization of imaging panel 21 and generation of image signals of radiation images are conducted based on operation signal PS in accordance with switching operation from the operation section 32. It is also possible to arrange so that generation of image signals of radiation images is conducted when a radiation irradiation end signal is supplied from radiation source 10 through connector 35. Further, there is conducted processing to store the generated image signal in memory section 31.

In this case, if the radiation image detector 20 is made to be mounted and dismounted freely through connector 35, by providing power supply section 34 on the radiation image detector 20 and by providing the memory section 31 that stores image signals of radiation images, as shown in FIG. 2, it is possible to build the system in which the radiation image detector 20 is portable. Further, if the memory section 31 is made to be detachable by using a non-volatile memory, it is possible to supply image signals to image processing section 51, just by mounting the memory section 31 on the image processing section 51 without connecting the radiation image detector 20 with the image processing section 51, which makes radiographing for radiation image and image processing to be more easy, and improves operations to be easy. Incidentally, when the radiation image detector 20 is used as a floor type one, if electric power is supplied through connector 35 and image signals are read, image signals of radiation images can naturally be obtained even when memory 31 and power supply section 34 are not provided.

In the aforementioned embodiment, the fourth layer 214 representing a base board is made of resin as stated above, which realizes light weight, compared with a conventional radiation image detector employing a glass base board. Further, because of the fourth layer that is made of resin, the third layer 213 that is formed on the fourth layer 214 is formed by using the element of a layer upon layer structure with divided silicone or formed with organic semiconductor. Therefore, it is not necessary to use an expensive and specific manufacturing equipment wherein a thin-film transistor containing mainly silicone is formed on a glass base board as in the conventional radiation image detector using a glass base board, which makes it possible to manufacture a radiation image detector at low cost.

Further, since the second layer 212 formed on the third layer 213 is made of a photoconductive high molecular organic compound and fullerene or of carbon nanotube, it is not necessary to use a manufacturing equipment for photo-semiconductor using silicone, and in terms of this point, a radiation image detector can be manufactured at low cost.

In the invention, a first layer that emits light in accordance with intensity of entering radiation, a second layer that converts light outputted from the first layer into electric energy and a fourth layer that holds a third layer which conducts generation and outputting for signals based on the electric energy obtained by the second layer, are made of resin, which makes a detector that generates image signals based on entering radiation to be light in weight.

Since cesium iodide (CsI:Tl) or gadolinium oxysulfide ($Gd_2O_2S$:Tb) is used for the first layer, radiation images having high image quality can be obtained. Further, the second layer is formed by using an organic compound capable of converting photoconductively, and the third layer is formed by using organic semiconductor or an element of a layer upon layer structure with divided silicone, which makes it possible to manufacture a detector at low cost.

Further, since the first-fourth layers, a power supply means and a storage means are unified integrally to be of a portable structure, radiographing for radiation images can be conducted simply. Since there are further provided a power supply means that supplies power for generating image signals based on entering radiation and a storage means that stores image signals, it is possible to obtain image signals of radiation images without connecting with peripheral equipment conducting reading of image signals and processing of signals. Further, because of the storage means that is detachable, supply of image signals to peripheral equipment can be carried out simply and easily.

What is claimed is:

1. A radiation image detector, comprising:

a first layer to emit light corresponding to a strength of a radiation incident thereon;

a second layer to convert the light emitted from the first layer into electric energy;

a third layer to accumulate the electric energy obtained by the second layer and to output a signal based on the accumulated electric energy so that the radiation image detector outputs an image signal corresponding to the incident radiation based on the signal outputted from the third layer; and a fourth layer made of a resin and to hold the first, second and third layers, wherein the fourth layer is a elastic film, and wherein the plastic film contains a plasticizer of triocylphosphate or dibutylphthalate.

2. The radiation image detector of claim 1, wherein the plastic film is made of one of polyethylene terephthalate (PET), polyethylene naphthalate (PEN), polyether sulf one (PES), polyether imido, polyether etherketone, polyphenylene sulfido, polyallylate, polyimido, polycarbonate (PC), cellulose triacetate (TAC) and cellulose acetate propionate (CAP).

3. The radiation image detector of claim 1, wherein the plastic film contains a UV absorber of a benztriazole type or a benzophenone type.

4. The radiation image detector of claim 1, wherein the plastic film is made of a resin produced by an organic-inorganic polymer hybrid method.

5. The radiation image detector of claim 1, wherein the first layer is made of one of cesium iodide (CsI:Tl) and gadolinium oxysulfide ($Gd_2O_2S$:Tb).

6. The radiation image detector of claim 1, wherein the first layer is made of phosphor particle containing oxygen O and a rare-earth element of gadolinium Gd and europium Eu.

7. The radiation image detector of claim 6, wherein a crystallite size of the phosphor particle is 10 nm to 100 nm.

8. The radiation image detector of claim 6, wherein the phosphor particle is a material represented by the following general formula:

$$(Gd, M, Eu)_2O_3$$

where M represents a rare-earth element.

9. The radiation image detector of claim 8, wherein at least one of yttrium Y, niobium Nd, terbium Tb, dysprosium Dy, holmium Ho, erbium Er, thulium Tm and ytterbium Yb is used as the rare-earth element M.

10. The radiation image detector of claim 6, wherein the phosphor particle contains the gadolinium Gd of 40 wt % to 95 wt %, the M of 5 wt % to 40 wt % and the europium Eu of 2 wt % to 20 wt %.

11. The radiation image detector of claim 6, wherein a particle size of the phosphor particle is 0.5 $\mu$m to 2 $\mu$m.

12. The radiation image detector of claim 1, wherein the second layer is made of an organic compound capable of conducting photoelectric conversion.

13. The radiation image detector of claim 12, wherein the organic compound is a conductive polymer.

14. The radiation image detector of claim 13, wherein the conductive polymer contains fullerene or carbon nanotube.

15. The radiation image detector of claim 1, wherein the third layer is made of an organic semiconductor.

16. The radiation image detector of claim 1, wherein the third layer is formed by using an element having a stacked layer structure of divided silicone.

17. The radiation image detector of claim 1, wherein the radiation image detector is shaped in a portable structure.

18. The radiation image detector of claim 17, further comprising a power source to supply electric power to drive the radiation image detector.

19. The radiation image detector of claim 18, further comprising a memory to memorize the image signals.

20. The radiation image detector of claim 19, wherein the memory is detachable from the radiation image detector.

* * * * *